| United States Patent [19] | [11] Patent Number: 5,049,294 |
| --- | --- |
| Van Zon et al. | [45] Date of Patent: Sep. 17, 1991 |

[54] MODIFIED DISPERSANT V.I. IMPROVER

[75] Inventors: Arie Van Zon; Gerarda J. Klaver, both of Amsterdam, Netherlands

[73] Assignee: Shell Oil Company, Houston, Tex.

[21] Appl. No.: 421,425

[22] Filed: Oct. 13, 1989

[30] Foreign Application Priority Data

Oct. 13, 1988 [GB] United Kingdom ................ 8824037

[51] Int. Cl.$^5$ .......................................... C10M 145/00
[52] U.S. Cl. ........................... 252/51.5 A; 252/56 R; 252/56 D; 525/92; 525/180; 525/190; 525/285; 525/301
[58] Field of Search ..................... 525/92, 180, 190; 252/51.5 A

[56] References Cited

U.S. PATENT DOCUMENTS

| 3,595,942 | 7/1971 | Wald et al. ............................ 260/880 |
| --- | --- | --- |
| 3,763,044 | 10/1973 | Anderson ............................... 252/59 |
| 3,772,196 | 11/1973 | St. Clair et al. ................. 252/32.7 E |
| 3,864,268 | 2/1975 | Culbertson et al. ............ 252/51.5 R |
| 4,077,893 | 3/1978 | Kiovsky ............................ 252/56 R |
| 4,116,917 | 9/1978 | Eckert .................................... 585/11 |
| 4,141,847 | 2/1979 | Kiovsky ......................... 252/51.5 A |
| 4,234,435 | 11/1980 | Meinhardt et al. ................. 252/49.9 |
| 4,358,565 | 11/1982 | Eckert .................................... 252/50 |
| 4,409,120 | 10/1983 | Martin .................................... 252/50 |
| 4,517,104 | 5/1985 | Bloch et al. ..................... 252/51.5 A |
| 4,557,849 | 10/1985 | Eckert .................................... 252/50 |
| 4,693,838 | 9/1987 | Varma et al. .................. 252/51.5 R |
| 4,849,481 | 7/1989 | Rhodes et al. ........................... 252/9 |

FOREIGN PATENT DOCUMENTS 1575507 2/1976 United Kingdom .

Primary Examiner—Prince E. Willis
Assistant Examiner—Ellen McAvoy
Attorney, Agent, or Firm—James O. Okorafor

[57] ABSTRACT

Improved dispersant/VI improver luboil additives are produced by reacting a hydrogenated conjugated diene star polymer or block copolymer with an alpha, beta unsaturated carboxylic acid or derivative to form an activated star polymer, which is then reacted with a) an alkyl carboxylic acid and b) an alkylamine or alkane polyol, or with the preformed product of reactants a) and b).

12 Claims, No Drawings

MODIFIED DISPERSANT V.I. IMPROVER

FIELD OF THE INVENTION

This invention relates to modified polymers having useful properties as additives for lubricating oils.

BACKGROUND

The newer engines place increased demands on the lubricants to be employed. In the past a number of different additives has been added to lubricating oils to improve properties such as viscosity index and dispersancy. One such additive added to lubricating oils to improve viscosity index is a two-block copolymer having the general configuration A-B where A is styrene and B is hydrogenated isoprene. See generally U.S. Pat. Nos. 3,763,044 and 3,772,196. A VI improver having greatly improved mechanical shear stability is the selectively hydrogenated star-shaped polymer disclosed in U.K. Patent Specification 1,575,507. Employing a single additive that improves a number of lubricant properties can achieve significant reductions in cost, and also circumvent the compatibility problems that can arise between the various additives and/or base oil. However, in attempting to improve more than a single lubricant property, care must be taken in not causing the deterioration of other properties. For example, the use of an oxidation step to attach polar groups to the polymer backbone in U.S. Pat. No. 3,864,268 leads to reduced lubricant stability by introducing sites for oxidative attack.

U.S. Pat. No. 4,141,847 describes hydrogenated conjugated diene star polymers and block copolymers having grafted dicarboxylic acid anhydride groups which are reacted with an amine to make ashless oil soluble additives having both dispersant and viscosity index improving properties.

U.S. Pat. No. 4,517,104 describes ethylene/α-olefin copolymers having grafted dicarboxylic acid anhydride groups which are reacted with a polyamine and an alkenyl succinic anhydride to make oil soluble viscosity index improvers having both dispersant and varnish inhibition properties.

SUMMARY OF THE INVENTION

According to the present invention, ashless, oil-soluble additives having both dispersant and viscosity-index (VI) improving properties are produced by
1) reacting an alpha-beta unsaturated carboxylic acid or active derivative thereof, preferably at a temperature of between about 100° C. and about 300° C. for between about 1 hour and about 24 hours, with a selectively hydrogenated star-shaped polymer comprising a polyvinyl aromatic nucleus having at least 4 polymeric arms e.g. 4–25 arms, which arms each can have a number average molecular weight of e.g. 5,000 to 150,000 and which are linked to said nucleus wherein said polymeric arms are selected from the group consisting of:
  i) hydrogenated homopolymers and hydrogenated copolymers of conjugated dienes;
  ii) hydrogenated copolymers of conjugated dienes and monoalkenyl arenes; and
  iii) mixtures thereof; and wherein at least 80%, preferably 90 to 98%, of the alphatic unsaturation of the star-shaped polymer has been reduced by hydrogenation while less than 20% of the aromatic unsaturation has been reduced; and
2) reacting the activated hydrogenated star polymer thus formed with:
  a) a long-chain alkane-substituted carboxylic acid or active derivative thereof, and
  b) with a $C_1$ to $C_{18}$ amine containing 1 to 8 nitrogen atoms and/or with an alkane polyol having at least two hydroxy groups; or with
  c) the preformed product of reactants a) and b).

DETAILED DESCRIPTION OF THE INVENTION

The star polymers employed in making the present dispersant VI improvers are generally produced by the process comprising the following reaction steps:
 (i) polymerizing one or more conjugated dienes in solution in the presence of an ionic initiator to form a living polymer;
 (ii) reacting the living polymer with a polyvinyl aromatic compound, preferably divinyl benzene, to form a star-shaped polymer; and
 (iii) hydrogenating the star-shaped polymer to form a hydrogenated star-shaped polymer. This preparation is described in detail in U.K. Patent Specification 1,575,507.

The living polymers produced in reaction step (i) of the present process are the precursors of the hydrogenated polymer chains which extend outwardly from the polyvinyl aromatic nucleus. Preferably each polymeric arm is a hydrogenated polyisoprene homopolymer.

The molecular weights of the star-shaped polymer to be hydrogenated in reaction step (iii) may vary between relatively wide limits. However, an important aspect of the present invention is that polymers processing good shear stability may be produced even though the polymers have very high molecular weights. It is possible to produce star polymers having peak molecular weights between about 25,000 and about 1,250,000. Preferred molecular weights are 100,000 to 500,000. These peak molecular weights are determined by gel permeation chromatography (GPC) on a polystyrene scale.

In step (iii), the star-shaped polymers are hydrogenated by any suitable technique. Suitably at least 80%, preferably about 90 to about 98%, of the original olefinic unsaturation is hydrogenated. The amount of aromatic unsaturation which is hydrogenated, if any, will depend on the hydrogenation conditions used. However, preferably less than 20%, more preferably less than 5%, of such aromatic unsaturation is hydrogenated.

The molecular weights of the hydrogenated star-shaped polymers correspond to those of the non-hydrogenated star-shaped polymers.

The hydrogenation can be carried out as described in U.K. Patent Specification 1,575,507, the preferred process being the selective hydrogenation process described in U.S. Pat. No. 3,595,942. In that process hydrogenation is conducted, preferably in the same solvent in which the polymer was prepared, utilizing a catalyst comprising the reaction product of an aluminum alkyl and a nickel or cobalt carboxylate or alkoxide. A favoured catalyst is the reaction product formed from triethyl aluminum and nickel octoate.

The hydrogenated star-shaped polymer is then recovered in solid form from the solvent in which it is hydrogenated by any convenient technique such as by evaporation of the solvent. Alternatively, an oil, e.g. a lubricating oil, may be added to the solution and the solvent stripped off from the mixture so formed to produce concentrates. Easily handleable concentrates are produced even when the amount of hydrogenated star-shaped polymer therein exceeds 10% wt. Suitable concentrates contain from 10 to 25% wt of the hydrogenated star-shaped polymer.

The selectively hydrogenated star polymers as prepared above do not in themselves have adequate dispersancy characteristics and are modified as explained below.

1) The star polymer is first activated by reaction with an alpha-beta unsaturated carboxylic acid or active derivative thereof. By "active derivative thereof" is meant anhydrides, esters and the like. Suitable unsaturated acids and derivatives include maleic acid, maleic anhydride, itaconic acid, dimethyl itaconate, acrylic acid, ethyl acrylate, methacrylic acid, methyl methacrylate, oleic acid, linoleic acid, etc., with maleic anhydride being especially preferred.

The unsaturated carboxylic compound and the hydrogenated star polymer are suitably reacted together at a temperature of between 100° C. and 300° C., preferably between 130° C. and 250° C. The contacting time may be between 1 hour and 24 hours, preferably between 4 hours and 8 hours. The carboxylic compound reacts with the residual olefinic bonds available on the diene portion of the star polymer, and/or with the radicals initiated on the polymer chain; temperatures between 100° C. and 150° C. being suitable in the latter case.

Various solvents may be employed in the carboxylic acid derivative addition step 1) including generally olefin-free petroleum hydrocarbons, aromatics and halogenated hydrocarbons. A preferred solvent is a lubricating oil basestock. Preferably a concentration in the range of about 1% to about 20% by weight of the copolymer in solvent may conveniently be used for this conversion.

Generally the amount of unsaturated carboxylic compound is in excess over that stoichiometrically necessary to react with all the residual double bonds remaining in the diene portion of the selectively hydrogenated star polymer. Preferably, at least one mole of carboxylic compound is used for each olefinic unsaturation present in the selectively hydrogenated star polymer, with equivalent ratios of carboxylic compound to olefinic double bonds of between 1:1 and 2:1 being particularly suitable. However, less than stoichiometric amounts of carboxylic compound may also be used.

The above reaction may be carried out with or without the use of catalyst or radical initiators such as tert. butyl hydroperoxide or tert. butyl perbenzoate. Any excess carboxylic compound is typically removed either by vacuum distillation or through the use of a stripping gas stream.

2) The activated hydrogenated star polymer resulting from the above reaction with unsaturated carboxylic acid is then modified by reaction with:

a) a long-chain alkane-substituted carboxylic acid or active derivative thereof, preferably succinic acid, anhydride or ester, and b) with a $C_1$ to $C_{18}$ amine containing 1 to 8 nitrogen atoms and/or with an alkane polyol having at least two hydroxy groups; or with c) the preformed product of reactants a) and b). Reaction of the activated star polymer with the alkane carboxylic acid (reactant a), alkylamine or alkane polyol (reactant b), or the pre-formed reaction product of a) and b), is suitably effected by heating these reactants together, suitably at a temperature between 100° C. and 200° C., preferably between 140° C. and 170° C. The reaction may be carried out in the presence of a solvent, conveniently the same solvent as that used in the star polymer activating step 1), a luboil basestock being particularly convenient for both process steps. It is desirable to operate under an inert atmosphere, suitably nitrogen.

The long-chain alkane-substituted carboxylic acid/-derivative is preferably derived by reacting an alpha-beta unsaturated carboxylic acid or active derivative thereof with a polyolefin, suitably a homopolymer or copolymer of one or more olefin monomers having 2 to 16, preferably from 2 to 6, carbon atoms. The copolymers include random, block and tapered copolymers. Suitable monomers include ethene, propene, butenes, isobutene, pentenes, octenes, and also diolefins such as butadiene and isoprene. If a diene is used as a monomer the resulting polymer is preferably hydrogenated to saturate at least 90%, more preferably substantially all unsaturated bonds. It is especially preferred to use a polyolefin substituent derived from polyisobutylene.

The number average molecular weight of the polyolefin substituent is suitably not greater than 5000, since molecular weights above 5000 can impair the dispersancy properties of the final products, especially in crankcase lubricants. To reduce the risk of problems the number average molecular weight is preferably from 700 to 3000. The number average molecular weight (Mn) can easily be determined by vapor pressure osmometry or by gel permeation chromatography with calibration of the polymer, as will be appreciated by those skilled in the art. The weight average molecular weight (Mw) can also be determined by gel permeation chromatography. The quotient Mw/Mn, which is a measure indicating the width of molecular weight distribution, suitably has a value from 1.5 to 4.0.

The unsaturated acid reacting with the polyolefin may be any of those listed earlier as suitable for activating the hydrogenated star polymer, maleic acid or anhydride being particularly preferred. In the case of maleic acid/anhydride, the addition of the polyolefin to the unsaturated bonding yields a polyolefin-substituted succinic acid derivative.

The average number of carboxylic acid groups per polyolefin moiety is normally between 0.5 and 1.5. This means that some of the polyolefin moieties are connected to more than one succinic group. Preferably, the average number of succinic groups per polyolefin moiety is between 0.9 and 1.1.

The polyolefin-substituted carboxylic acids may be prepared according to established procedures from an alkene of required molecular weight and an appropriate amount of the unsaturated carboxylic acid or active derivative. Thus, the polyolefin, e.g. polyisobutylene, may be mixed with maleic anhydride and chlorine mixed with maleic anhydride and chlorine passed through the mixture, yielding hydrochloric acid and polyolefin-substituted succinic anhydride, e.g. polyisobutenyl succinic anhydride (PIBMALA), as described in e.g. GB-A-949,981. Another method for the preparation of polyolefin substituted succinic anhydride is described in U.S. Pat. No. 3,172,892, according to which a halogenated, in particular chlorinated, polyolefin is reacted with maleic anhydride.

From e.g. NL-A-74 12 057 it is known to prepare hydrocarbon-substituted succinic anhydride by thermally reacting a polyolefin with maleic anhydride, a procedure which may be combined with that of GB-A-949,981, as is illustrated in GB-A-1,440,219 and GB-A-1,543,627. The products prepared in this way include compounds in which the polyolefin chain is connected to one or both of the alpha carbon atoms of the succinic group.

The amine or polyol modifier (reactant b) confers dispersant properties in the final modified star polymer combined VI improver/dispersant.

The $C_1$ to $C_{18}$ amines employed in the instant invention can be branched or unbranched, saturated, aliphatic, primary or secondary amines, containing 1 to 8 nitrogens, preferably mono- or diamines, such as ethylamine, butylamine, sec butylamine, diethylamine, 3-dimethylamino propylamine, etc., but including higher polyamines such as alkylene polyamines, wherein pairs of nitrogen atoms are joined by alkylene groups of 2 to 4 carbon atoms. Thus, polyamines of the formula:

$$NH_2(CH_2)_n-[NH(CH_2)_n]_m-NH_2$$

are included where n is 2 to 4 and m is 0 to 6. Examples of such polyamines include tetraethylene pentamine, tripropylene tetramine, triethylene tetramine, diethylene triamine, N-aminoalkyl piperazines, e.g., N-(2-aminoethyl) piperazine, N,N'-di(2-aminoethyl) piperazine, etc. Preferred are diethylene triamine, triethylene tetramine or tetraethylene pentamine, as well as corresponding commerical mixtures such as "Polyamine H", and "Polyamine 500".

The alkane polyols useful in making the esters are alkane polyols having at least two and preferably at least four hydroxy groups such as the trihydroxyalkanes, e.g. ethylene glycol, propylene glycol, polymethylene glycols, trihydroxybutanes, pentanes, hexanes, heptanes, octanes, nonanes, dodecanes, etc., as well as tetrahydroxy alkanes, pentahydroxy alkanes, hexahydroxy alkanes, as well as the sugar alcohols such as erythritol, pentaerythritol, tetritols, pentitols, hexitols, mannitol, sorbitol, glucose and the like. Particularly preferred alcohols are pentaerythritol and mannitol. Especially preferred is pentaerythritol.

The molar ratio of amine or polyol to the sum of the carboxylic compounds is typically between about 0.1:1 and about 2:1, preferably between about 0.25:1 and about 2:1, most preferably about 0.5:1. The conditions during imide formation or esterification are typically about 150° C. to 250° C. for between about 1 hour and 20 hours.

In both reaction steps a) and b) it is much preferred that the reactions take place in the absence of oxygen. A nitrogen blanket is often used to accomplish this result. The reason for performing the reaction in the absence of oxygen is that the resulting additive may be more oxidatively unstable if any oxygen is present during the formation of the additive.

If excess amine or polyol is employed, then it may be desirable to remove the excess. One means of doing this is to first exchange the tri-chlorobenzene solvent for a lube base stock by vacuum distillation, and then add a volume of heptane equal to the volume of oil solution. Then an equal volume of methanol is added and mixed. Two separate layers are therein formed upon settling; one layer comprising predominantly wash solvent and the unreacted amine or polyol, and a second layer comprising predominantly oil, heptane, and the additive product. After separating the wash layer, the volatiles present in the product layer can then be removed by a distillation technique. Alternatively, the excess amine or polyol may be removed under a vacuum or with a stripping gas stream.

The dispersant VI improvers of the present invention possess a useful combination of viscosity improving properties with oxidative stability, mechanical shear stability, and dispersancy. In particular, lubricating oils containing these VI improver/dispersants possess a good combination of thickening efficiency and shear stability at high temperature and also good low temperature viscosity characteristics. A lower amount of the present VI improver/dispersants is normally required in order to obtain the required thickening performance, as compared with the prior art VI improvers. Further, the VI improver/dispersants also possess a superior combination of oxidative shear stability, permanent shear stability, and "temporary shear loss". Temporary shear loss refers to the temporary viscosity loss at high shear stress conditions resulting from the non-Newtonian character of the polymeric VI improvers. Still further, the dispersing power of the instant polymeric additive is excellent.

The reaction product of this invention can be incorporated in lubricating oil compositions, e.g. automotive crankcase oils, in concentrations e.g. within the range of about 0.1 to about 15, preferably about 0.1 to 3 weight percent based on the weight of the total compositions. The lubricating oils to which the additives of the invention can be added include not only mineral lubricating oils, but synthetic oils also. Synthetic hydrocarbon lubricating oils may also be employed, as well as non-hydrocarbon synthetic oils including dibasic acid esters such as di-2-ethyl hexyl sebacate, carbonate esters, phosphate esters, halogenated hydrocarbons, polysilicones, polyglycols, glycol esters such as $C_{13}$ oxo acid diesters of tetraethylene glycol, etc. When used in gasoline or fuel oil, e.g. diesel fuel, No. 2 fuel oil, etc., then usually about 0.001 to 0.5 weight percent, based on the weight of the total composition of the reaction product will be used. Concentrations comprising a minor proportion, e.g. 15 to 45 weight percent, of said reaction product in a major amount of hydrocarbon diluent, e.g. 85 to 55 weight percent mineral lubricating oil, with or without other additives present, can also be prepared for ease of handling.

In the above compositions or concentrates, other conventional additives may also be present, including dyes, pour point depressants, antiwear agents, e.g. tricresyl phosphate, zinc dialkyl dithiophosphates of 3 to 8 carbon atoms, antioxidants such as phenyl-alpha-naphthylamine, tert-octylphenol sulphide, bis-phenols such as 4,4-methylene bis(3,6-di-tert-butylphenol), viscosity index improvers such as the ethylene-higher olefin copolymer, polymethylacrylates, polyisobutylene, alkyl fumaratevinyl acetate copolymers, and the like as well as other ashless dispersants or detergents such as overbased sulphonates.

The invention is further illustrated by means of the following Examples, which are given for the purpose of illustration alone, and are not meant to limit the invention to the particular reactants and amounts disclosed.

EXAMPLE 1

A concentrate of 341 grams SHELLVIS ® 200 star polymer in 2,139 grams of XHVI-6 oil (13.8% m/m) was reacted under stirring with 6.8 grams maleic anhydride (2% m/m on star polymer) at 133° C. for 18 hours in the presence of 9.2 grams of Trigonox C (75% tert. butylperbenzoate) in a $N_2$-atmosphere (50 ppm $O_2$). The radical initiator is dosed (by pumping) in a 41 minute period (as a 50% m/m solution in a portion of the XHVI-6 oil).

Then the reaction mixture was stripped at 110° C. under high vacuum (0.06 mm Hg) to remove residual non-reacted maleic anhydride.

The maleic anhydride (MALA) content of the thus obtained VI-improver concentrate was determined by titration with 0.1 mol/l sodium methoxide solution in methanol, using phenolphthalein as the indicator. The MALA contents of the reaction product was 0.022 mmol/g product before high vacuum stripping, and was 0.019 mmol/g product after stripping. The theoretical MALA-contents (assuming 100% grafting) is 0.028 mmol/g. Therefore the efficiency of MALA grafting is maximally some 70%.

EXAMPLE 2

A reaction mixture of 1112.7 grams of the stripped reaction product from Example 1 and 21.7 grams of PIBMALA (1.95 meg/g Acid Number) was heated to 150° C. under stirring in a $N_2$ atmosphere. Then, 2.18 grams (2.29 ml) of diethylenetriamine (DETA) was dosed by continuous pumping in 57 minutes. The temperature was raised to 175° C. and the reaction mixture was kept at that temperature for 4 hours. During the last hour $N_2$ was bubbled through the reaction mixture to remove the last traces of $H_2O$ and other residual volatiles.

EXAMPLE 3 (Comparison)

A mixture of 1280.1 grams of the stripped reaction product from Example 1, 224 grams of xylene (to reduce the viscosity), and 12.40 g dimethylaminopropylamine (DAP) (a 5-fold excess based on grafted MALA) was reacted for 1 hour at 80° C. under stirring in a $N_2$ atmosphere. Then the xylene was stripped off at 130° C. at 0.03 mm Hg after which the reaction product was kept for 3 hours at 170° C. in a $N_2$ atmosphere under stirring. The last hour $N_2$ was led through the reaction mixture to remove the last traces of $H_2O$ and other residual volatiles.

EXAMPLE 4

At 100° C. 101.48 g of PIBMALA in xylene (as a 52.2% solution) was added over 3 hours to 20.38 g of DETA in a $N_2$ atmosphere. After cooling to room temperature the xylene was distilled off in vacuum and then the unconverted DETA was removed by vacuum distillation at 170° C. The product is a mixture of PIBMALA-DETA and (PIBMALA)$_2$DETA which can be reacted with the product of Example 1 to form a PIBMALA/DETA/MALA grafted star polymer.

EXAMPLE 5

Various other grafted star polymers were prepared generally according to the procedure outlined in Examples 1 and 2, including several outside the present invention for comparative purposes. The salient details of the experiments are given in Table I.

TABLE I

| | Intake first step | | | | | | | Intake second step | |
|---|---|---|---|---|---|---|---|---|---|
| | Shellvis ® 200 Star Polymer Concentrate | MALA | | Trigonox C | | Dosing time Trig C | MALA mmol | Star polymer/MALA | mmol |
| Test Product | g | g | % w on star | g | % w on star | min. | g | g | MALA |
| Q | 3360.2 | 9.27 | 2 | 12.52 | 2.7 | 56 | 0.016 | 3241.5 | 51.96 |
| M | 2470.6 | 6.82 | 2 | 9.21 | 2.7 | 41 | 0.019 | 1112.7 | 21.14 |
| N (comp) | 2470.6 | 6.82 | 2 | 9.21 | 2.7 | 41 | 0.019 | 1280.1 | 24.32 |
| T | 3701.0 | 10.21 | 2 | 13.79 | 2.7 | 41 | 0.016 | 1843.5 | 29.7 |
| U | 3701.0 | 10.21 | 2 | 13.79 | 2.7 | 41 | 0.016 | 1796.2 | 28.7 |
| R | 3585.1 | 4.95 | 1 | 13.36 | 2.7 | 40 | 0.01 | 1856.7 | 18.6 |
| S (comp) | 3585.1 | 4.95 | 1 | 13.36 | 2.7 | 40 | 0.01 | 1708.6 | 17.09 |
| V (comp) | 3585.2 | 19.79 | 4 | 13.36 | 2.7 | 40 | 0.04 | 1775.1 | 71.0 |

| | | Intake second step | | | Dosing time amine | Product | | |
|---|---|---|---|---|---|---|---|---|
| | PIB/ | Amine | | | | Star | N theoretical | |
| Test Product | MALA | Type | g | mmol | min. | % w | % w on star | % w on conc. |
| Q | 53.2 | DETA | 5.34 | 51.84 | 56 | 13.44 | 0.49 | 0.066 |
| M | 21.7 | DETA | 2.18 | 21.17 | 57 | 13.4 | 0.57 | 0.078 |
| N (comp) | — | DAP | 12.40 | 121.6 | — | 13.6 | 0.39 | 0.053 |
| T | 30.5 | TEPA | 5.62 | 29.7 | 59 | 13.2 | 0.83 | 0.11 |
| U | 29.5 | TETA | 4.20 | 28.8 | 59 | 13.4 | 0.66 | 0.088 |
| R | 19.0 | DETA | 1.91 | 18.54 | 54 | 13.5 | 0.31 | 0.041 |
| S (comp) | — | DAP | 8.7 | 85.3 | — | 13.7 | 0.20 | 0.08 |
| V (comp) | — | DAP | 36.2 | 355 | — | 13.6 | 0.82 | 0.112 |

1st step Reaction time and temperature 18 hrs 133–135° C.
2nd step Amine addition at 150° C. 4 hrs 175° C.
Reaction with DAP Star Polymer/MALA concentrate diluted with xylene.
Addition of 5 equivalents of DAP 1 hr at 80° C. - Removal of xylene at 130° C.
3 hrs at 170° C.

EXAMPLE 6

Certain of these VI improvers, and also existing commercially available VI improvers ("SHELLVIS ®" 250 star polymer, ECA 8358, and TLA 656), were blended (as a concentrate in mineral oil) with a SAE 10 w/40 luboil containing some 8% w/w of an additive package comprising an overbased salicylate detergent, a succinimide ashless dispersant, a zinc-based anti-wear additive and a polymethacrylate pour point depressant. The resulting oil was then evaluated according to the sequence VE (as described in "Sequence VE test procedure", 7th draft dated 19th May, 1988; ASTM Monitoring Center, 4400 5th Avenue, Pittsburgh USA). The results of these evaluations are set out in Table II, from which it clearly emerges that Product M (present invention) provides the best performance for each of the parameters evaluated.

TABLE II

| | VI Improver (% w/w concentrate) | VE Test Parameter | | |
|---|---|---|---|---|
| | | Rocker Arm Sludge (RAC) | Av. Engine Sludge (AES) | Av. Cam Lobe Wear (μm) |
| SG Pass Limit | — | ≧7.5 | ≧9 | ≦125 |
| Shellvis ® 250 Star polymer (comp.) | 8.4 | 2.2 | 3.5 | 198 |
| ECA 8358 (comp.) | 11.0 | 7.9 | 8.9 | 63 |
| TLA 656 (comp.) | 10.4 | 6.7 | 6.6 | 159 |
| Product N. (comp.) (2% MALA/DAP) | 8.8 | 7.2 | 7.4 | 126 |
| Product M. (2% MALA/DETA/PIBMALA) | 6.0 | 8.0 | 9.2 | 18 |

What is claimed:

1. A dispersant/VI improver, produced by the sequential steps of:
    reacting an alpha-beta unsaturated carboxylic acid, anhydride, or ester with a star polymer having a poly(polyvinyl aromatic) nucleus and at least 4 polymeric arms linked to the nucleus, wherein the polymeric arms are selected from the group consisting of hydrogenated homopolymers and hydrogenated copolymers of conjugated dienes and monoalkyenyl arenes, and mixtures thereof; and
    further reacting the star polymer with a long chain alkane-substituted carboxylic acid and a $C_1$ to $C_8$ amine containing 1 to 8 nitrogen atoms or an alkane polyol having at least two hydroxy groups.

2. The VI improver as claimed in claim 1, wherein the number of polymeric arms is between 4 and 25, and the poly(polyvinyl aromatic) nucleus is poly(divinyl benzene).

3. The VI improver as claimed in claim 1, wherein wherein each polymeric arm of the star polymer has a number average molecular weight between 5,000 and 150,000, and the peak molecular weight of the hydrogenated star polymer is between about 25,000 and about 1,250,000.

4. The VI improver as claimed in claim 1, wherein the star polymer and the carboxylic acid, anhydride, or ester are reacted in a ratio of moles of carboxylic acid, anhydride or ester to olefinic double bonds remaining in the selectively hydrogenated star-shaped polymer of between about 1:1 and about 2:1.

5. The VI improver as claimed in claim 1, wherein the star polymer and the carboxylic acid, anhydride, or ester are reacted at a temperature between 130° C. and 250° C.

6. The VI improver as claimed in claim 1, wherein the long chain alkane substituted carboxylic acid is polyisobutenyl succinic acid.

7. The VI improver as claimed in claim 6 wherein the alpha, beta unsaturated carboxylic acid or anhydride is maleic anhydride.

8. The VI improver as claimed in claim 1, wherein the $C_{1-8}$ amine has the formula $$NH_2(CH_2)_n-[NH(CH_2)_n]_m-NH_2$$

where n is 2 to 4 and m is 0 to 6.

9. The VI improver as claimed in claim 1, wherein the amine is diethylene triamine, triethylene tetramine or tetraethylenepentamine.

10. The VI improver as claimed in claim 1, wherein the alkane polyol is pentaerythritol.

11. A lubricating composition comprising a major amount of a lubricating oil and a minor amount of a VI improver as claimed in claim 1.

12. The lubricating composition of claim 11, wherein the amount of the VI improver is between 0.1 and 3 percent by weight.

* * * * *